United States Patent [19]

Hattori

[11] Patent Number: 5,242,228
[45] Date of Patent: Sep. 7, 1993

[54] SPHERICAL SLIDE BEARING

[75] Inventor: Takaji Hattori, Hamamatsu, Japan

[73] Assignee: Kabushiki Kaisha Somic Ishikawa, Tokyo, Japan

[21] Appl. No.: 911,406

[22] Filed: Jul. 10, 1992

[30] Foreign Application Priority Data

Jul. 11, 1991 [JP] Japan .................. 3-171341

[51] Int. Cl.$^5$ .................. F16C 33/74; F16C 23/04
[52] U.S. Cl. .................. 384/145; 384/153; 384/206
[58] Field of Search .............. 384/130, 140, 141, 145, 384/146, 147, 151, 153, 192, 206, 213

[56] References Cited

U.S. PATENT DOCUMENTS

| 4,447,094 | 5/1984 | Trudeau et al. | 384/145 |
| 4,483,569 | 11/1984 | Smith | 384/145 X |
| 5,033,872 | 7/1991 | Ueno et al. | 384/146 |

FOREIGN PATENT DOCUMENTS

| 1250205 | 9/1967 | Fed. Rep. of Germany | 384/153 |
| 684720 | 6/1930 | France | 384/206 |

*Primary Examiner*—Thomas R. Hannon
*Attorney, Agent, or Firm*—Thomas R. Morrison

[57] ABSTRACT

A spherical slide bearing having dust covers fixed by outer sealing collar portions interposed between a housing and a bearing or bearings. The interposed outer sealing collar portions of the dust covers are retained by flange portions of the housing and the bearing such that they are not forced out through narrow gaps therebetween through which bellows of the dust covers pass. Interference by the outer sealing collar portions with the degree of angular movement of a ball stud of the spherical slide bearing and damage to the dust covers is thus prevented. Tapered motion limiting surfaces incorporated into one of a ball stud, an inside bearing surface, and a ball stud and an inside bearing member surface provide an increased range of angular movement while protecting the dust cover from damage.

10 Claims, 4 Drawing Sheets

SPHERICAL SLIDE BEARING

BACKGROUND OF THE INVENTION

1. Field of the Invention

The present invention relates to a spherical slide bearing used in, for example, a suspension mechanism of an automobile, and more particularly, to a spherical slide bearing whose dust covers are securely held between a housing and a bearing.

2. Description of the Prior Art

Conventional spherical slide bearings, as described in Japanese Patent publication Laid-Open No. 24614/1983, call for tightly holding a dust cover between a housing and a bearing as shown in FIG. 7. In such a conventional spherical slide bearing a ball portion 1 of a ball stud (a tube) 3 is carried within the bearing 6 and stud portions 2 project from two open ends 5 of the housing 4. The ball stud 6 consists of ball portion 1 and stud portions 2 formed at the axial ends of ball portion 1. The spaces between the open ends of housing 4 and the stud portions 2 of the ball stud 3 are respectively sealed by a pair of dust covers having bellows 7. The dust covers 7 are formed of an elastic material, such as rubber, and have sealing collar portions 8 around the outer surfaces thereof compressed between housing 4 and bearing 6. Flange portions 9, formed by swaging both ends of housing 4, hold bearing 6 and sealing collar portions 8 of both dust covers 7 tightly together.

In the above conventional spherical slide bearing, flange portions 9 are formed by swaging housing 4 while applying an opposing load to bearing 6 via ball portion 1 of ball stud 3 to compress sealing collar portions 8 of dust covers 7. During this operation a part of the compressed sealing collar portions 8 is forced out of aperture ends 5 of flange portions 9. As a result, the part that has been forced out is interposed between flange portion 9 and ball stud 3 and hinders angular movement, reducing the range of angular movement. Therefore, the above configuration prevents the compressed sealing collar portions 8 and the spherical slide bearing from performing their intended functions.

The conventional structure presents a further problem in that when the ball stud 3 receives load in the direction of the interposed portions of the sealing collar portions 8, the interposed portions are caught between the ball stud and the aperture of a flange end and consequently torn.

OBJECTS AND SUMMARY OF THE INVENTION

It is an object of the present invention to provide a spherical slide bearing which overcomes the drawbacks of the prior art.

It is a further object of the present invention to provide a spherical slide bearing having dust covers fixed between a housing and a bearing or bearings in such a manner as they are not torn or damaged during operation and do not hinder the angular movement range of the device.

Another object of the present invention is to provide a spherical slide bearing having an increased range of angular movement while simultaneously preventing damage to a dust cover through the use of tapered motion limiting surfaces.

Briefly stated, the present invention provides a spherical slide bearing having dust covers fixed by outer sealing collar portions interposed between a housing and a bearing or bearings. The interposed outer sealing collar portions of the dust covers are retained by flange portions of the housing and the bearing such that they are not forced out through narrow gaps therebetween through which bellows of the dust covers pass. Interference by the outer sealing collar portions with the degree of angular movement of a ball stud of the spherical slide bearing and damage to the dust covers is thus prevented. Tapered motion limiting surfaces incorporated into one of a ball stud, an inside bearing surface, and a ball stud and an inside bearing member surface provide an increased range of angular movement while protecting the dust cover from damage.

An embodiment of the present invention includes a spherical slide bearing for slidably and pivotably carrying a member comprising: a bearing member, slide means for slidably carrying the member pivotably mounted in the bearing member, a housing into which the bearing member is mounted, cover means for closing openings between the housing and the slide means, the cover means having an end mounted between the bearing member and the housing in a gap formed between the bearing member and the housing, and means for retaining the end between the bearing member and the housing when compressed such that the end does not interfere with angular movement of the slide means.

Another embodiment of the present invention includes a spherical slide bearing for slidably and pivotably carrying a member comprising: a bearing member, slide means for slidably carrying the member pivotably having a stud portion, the slide means being mounted in the bearing member, a housing into which the bearing member is mounted, cover means for closing openings between the housing and the slide means, the cover means having an end mounted between the bearing member and the housing in a gap formed between the bearing member and the housing, the cover means passing between the slide means and the housing, and means for limiting angular motion of the slide means such that the slide means is precluded from compressing the cover means against the housing so as to prevent the cover means from being damaged.

The present invention additionally includes a spherical slide bearing comprising: a ball stud having a ball portion and stud portions formed at the axial ends of the ball portion, a housing, having a pair of apertures each at ends thereof, holding the ball portion having a bearing member therebetween, the stud portions of the ball stud projecting from the pair of apertures of the housing, dust covers for sealing spaces between the apertures of the housing and the stud portions of the ball stud, the dust covers having inner and outer sealing collar portions, flange portions formed radially inward at each aperture of the housing, each creating a narrow gap between each bearing and flange, the inner sealing collar portions of the dust covers being fitted around ends of the stud portions of the ball stud, and the outer sealing collar portions being pressed between the flange portions of the housing and the bearings in such a manner that the outer sealing collar portions are positioned radially outside the narrow gaps.

The present invention further includes the above embodiment having motion limiting surfaces formed upon at least one of the stud portions, the motion limiting surface extending from an outer edge of the ball portion of the ball stud the end of the stud portion, and having a diameter next to the ball portion greater than a diameter at the end of the stud portion. Additionally, the embodiment may include: a motion limiting surface formed at an outer end of an inner surface of the bearing member, and the motion limiting surface having a diameter which increases in size from an inner end to an outer end thereof.

According to an embodiment of the present invention, as the outer sealing collar portions of the dust covers are held at a position radially outside the narrow gaps by being interposed between respective inner ends of the flange portions formed at the two ends of the housing and the bearings, the outer sealing collar portions of the dust covers do not bulge out of the end apertures of the flange portions. Therefore, the outer sealing collar portions of the dust covers are prevented from coming between the flange portions and the ball stud to interfere with angular movement or reduce the range of angular movement. The dust covers are also thus prevented from being damaged or torn.

Other embodiments of the present invention include, tapered motion limiting surfaces formed on a ball stud or bearings. The ball stud is permitted greater angular movement and may accept a greater load because the ball stud is prevented from directly abutting against the dust covers. It is thus possible to increase the maximum angular movement range for the dust cover tear limit.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

Figure 1:
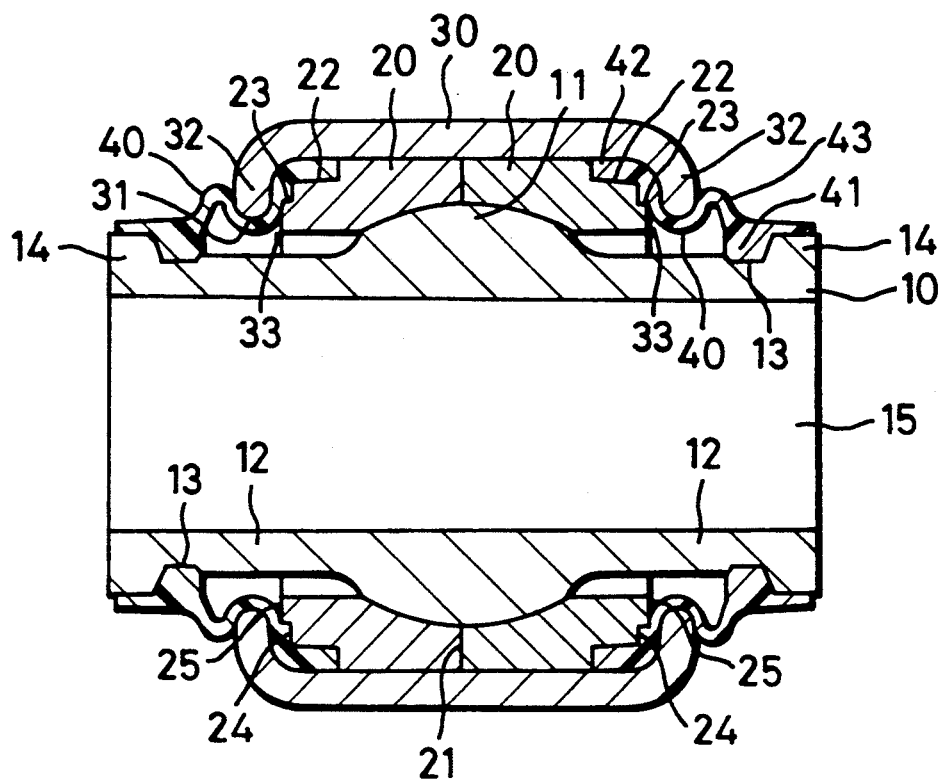
FIG. 1 is a vertical sectional view of a spherical slide bearing according to an embodiment of the present invention.
Figure 2:
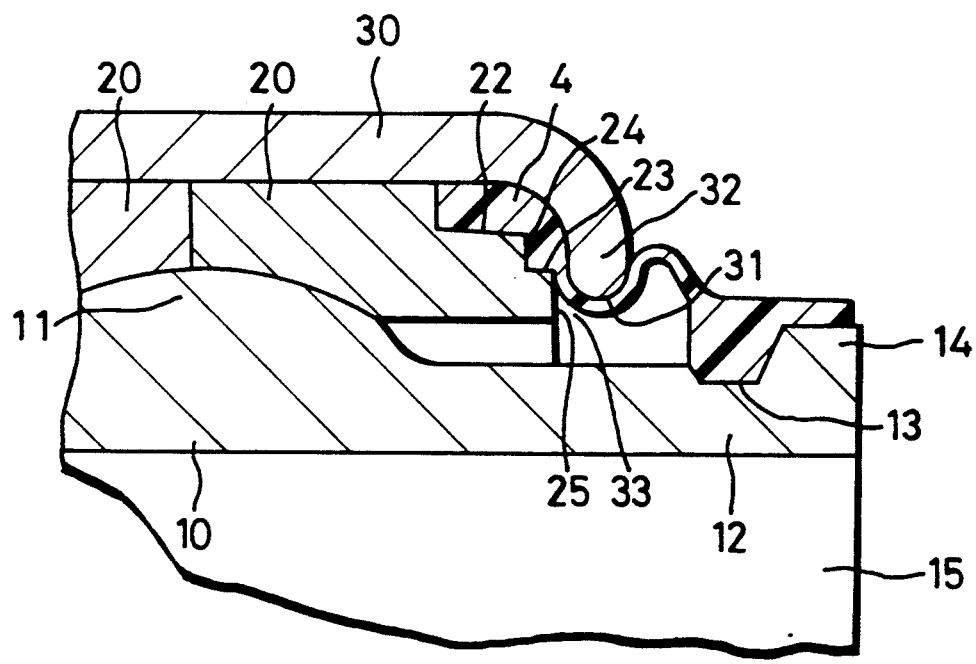
FIG. 2 is an enlarged vertical sectional view of the said spherical slide bearing.

Referring to FIGS. 1 and 2, an embodiment of a spherical slide bearing of the present invention includes a ball stud 10 consisting of a ball portion 11 having the spherical outer surface whose center is on an axis of the ball stud, and stud portions 12 formed contiguous with ball portion 11. The stud portions 12 project in the axial direction from the respective ends of the ball portion 11. An annular groove 13 is formed near the end of each stud portion 12 and an annular ridge 14, having a larger diameter than stud portion 12, is formed around the outer edge of groove 13. Ball stud 10 is tubular, having a through hole 15 in the center in the axial direction thereof.

A pair of bearings 20, 20 are fitted around an outer surface of ball portion 11 of ball stud 10. The two bearings are juxtaposed with abutting surfaces at their respective inner ends 21. Two step portions 22, 23 are circumferentially formed in the outer surface of the end of bearing 20. Ends of the steps normal to the axis of the bearing form middle and inner ridge surfaces 24, 25. Inner ridge surface 25 is the innermost surface and middle ridge surface 24 is the next innermost surface. A face surface of step portion 22 has an outer diameter and a length greater than a face surface of step portion 23.

A housing 30 is fitted around bearings 20, 20, covering the ball portion 11 and allowing stud portions 12 of ball stud 10 to project from respective end apertures 31 of housing 30. Ball stud 10 is thereby precessably supported by the bearings 20, between the housing 30 and the ball stud 10. Flange portions 32, 32 are formed by swaging the ends of housing 30 in the inward radial direction. An inner circumference of each flange portion 32 forms an end aperture 31 and extends at least to the inner ridge surface 25 of bearing 20 such that a narrow gap 33 is formed between flange portion 32 and the inner ridge surface 25.

A pair of dust covers 40 seal the spaced between end apertures 31 of housing 30 and stud portions 12 of ball stud 10. Dust covers 40 are formed of an elastic material such as natural rubber, synthetic rubber, polyurethane resin, etc., and consist of thick inner sealing collar portions 41. thick outer sealing collar portions 42 and diaphragm portions 43 therebetween.

Inner sealing collar portions 41 of both dust covers 40 are fitted into the annular grooves 13 of stud portions 12 of ball stud 10. Diaphragm portions 43 are positioned between corresponding stud portion 12 of ball stud 10 and the end apertures 31, 31 of housing 30. Outer sealing collar portions 42 are held between inner ridge surfaces 25 at the outer ends of bearings 20 and flange portions 32 of housing 30. Outer sealing collar portions 42 of each dust cover 40 are thus enclosed within corresponding flange portions 32 of housing 30 and step portions 22, 32 of bearings 20. The outer sealing collar portions 42 are compressed and sealed by middle ridge surfaces 24, 24 and flange portions 32, 32 radially outside the respective narrow gaps 33. Therefore, outer sealing collar portions 42 of dust covers 40 will not be expelled radially inward further than inner ridge surfaces 25, 25 by compression thereof.

Housing 30 is fitted around the outer surfaces of bearings 20, 20, which are fitted on ball portion 11 of ball stud 10. Inner sealing collar portions 41 of dust covers 40 are elastically fitted in annular grooves 13 formed in respective stud portions 12 of ball stud 10. Outer sealing collar portions 42 of dust covers 40 are brought into contact with the ridge and face surfaces of bearings 20 and flange portions 32 at both ends of housing 30 are then formed by swaging. As a result, each diaphragm portion 43 passes through the space between corresponding stud portion 12 of ball stud 10 and the end aperture of housing 30. Outer sealing collar portions 42 are held radially outside the respective narrow gaps 33 between ridge surfaces 25 at the outer ends of bearings 20 and flange portions 32 of housing 30. The outer sealing collar portion 42 of each dust cover 40 is elastically compressed and thus firmly fitted into corresponding flange portion 32 of housing 30 and step portions 22, 23 of bearing 20 and thus sealed by middle ridge surfaces 24, 24 and flange portions 32, 32. Therefore, because of the restriction created by the narrow gap 33 between the outer end of bearing 20 and flange portion 32 of housing 30 the outer sealing collar portions 42 of dust covers 40 do not bulge radially inward further than inner ridge surface 25. Consequently, outer sealing collar portions 42 do not bulge out of end apertures 31 of housing 30 and are thus not subject to damage, nor do they limit angular range.

According to the present embodiment, bearing 20 consists of a pair of half-split bearings. However, a bearing formed in one piece may also be used.

Figure 3:
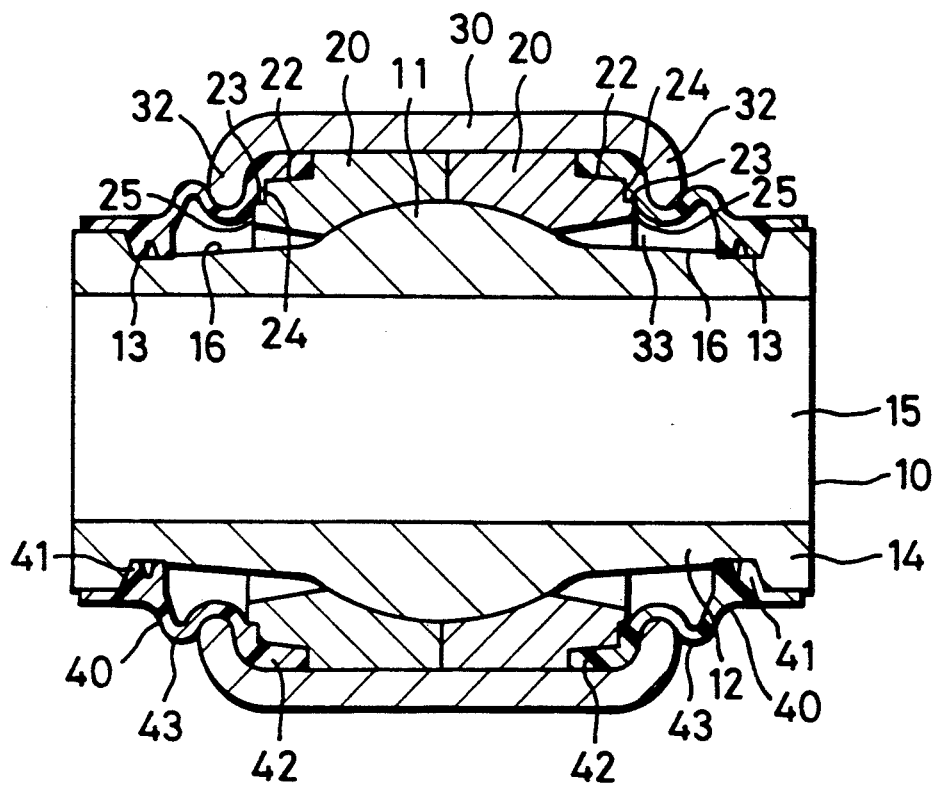
FIG. 3 is a vertical sectional view of a spherical slide bearing according to a second embodiment of the present invention.

Referring now to FIG. 3, a second embodiment has the features of the first embodiment discussed above and tapered motion limiting surfaces 16 respectively formed by the stud portion 12 extending from the outer ends of ball portion 11 to annular grooves 13. The motion limiting surfaces 16 have diameters next to the ball portion 11 that are larger than diameters thereof next to annular grooves 13.

Figure 4:
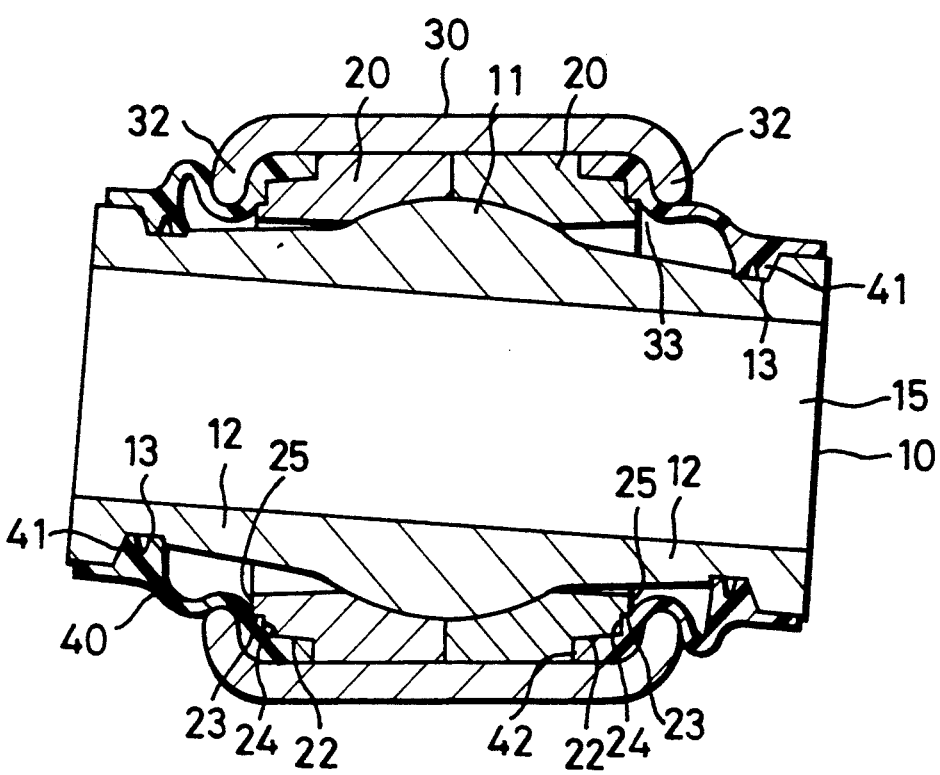
FIG. 4 is a vertical sectional view showing a second position of a ball stud of the spherical slide bearing after angular movement.

The operation of the structure of the second embodiment is shown in FIG. 4. Tapered motion limiting surfaces 16 prevent the dust covers 40 from directly receiving the shock when ball stud 10 pivots while increasing the maximum angular movement range and thus the dust cover tear limit.

Figure 5:
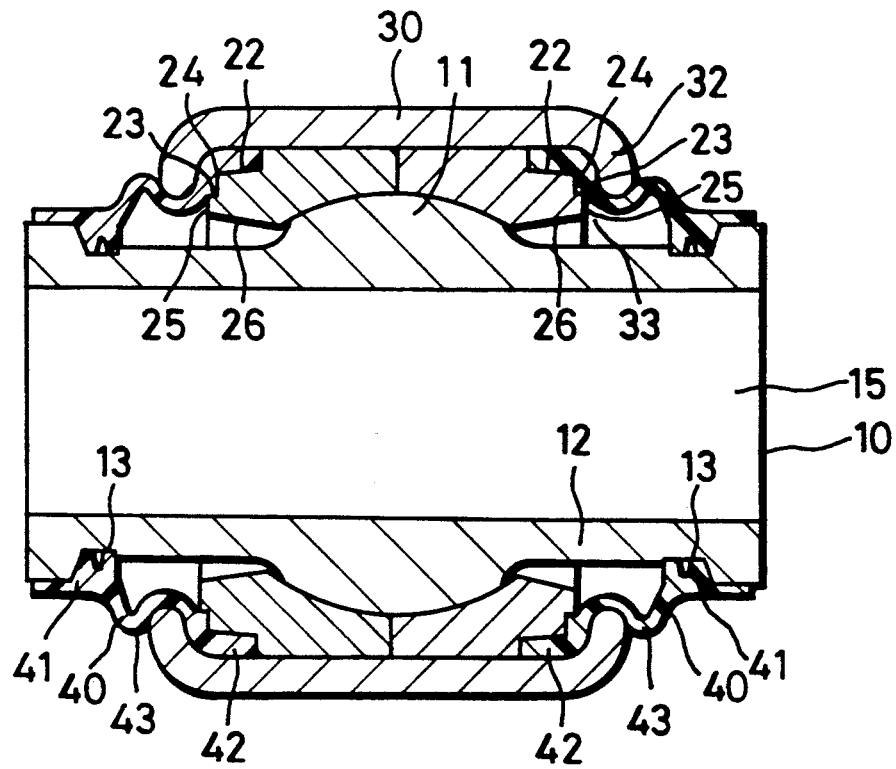
FIG. 5 is a vertical sectional view of a spherical slide bearing according to a third embodiment of the present invention.

Referring now to FIG. 5, a third embodiment of the invention incorporates the features of the first embodiment and has tapered motion limiting surfaces 26, formed in the inner surfaces of bearings 20, having diameters increasing in size from the inner end to the outer end. In a manner similar to the structure of the second embodiment, this structure improves the maximum angular movement range of the spherical slide bearing and thus the dust cover tear limit.

Figure 6:
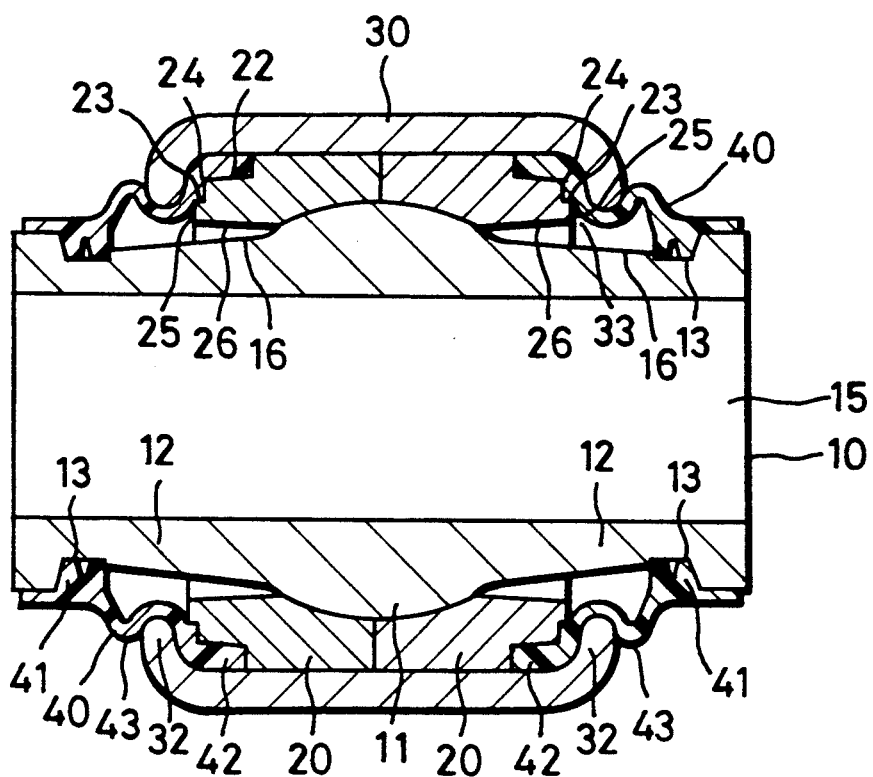
FIG. 6 is a vertical sectional view of a spherical slide bearing according to a fourth embodiment of the present invention.
Figure 7:
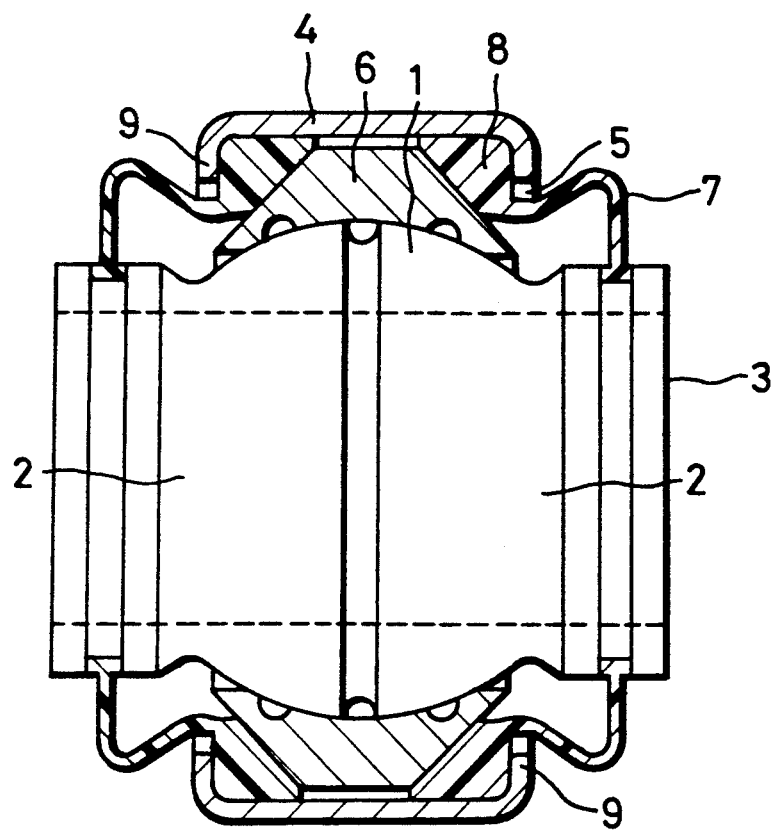
FIG. 7 is a vertical sectional view of a conventional spherical slide bearing.

Referring now to FIG. 6, a fourth embodiment differs from prior embodiments in that the maximum movement range and the dust cover tear limit may be further improved by forming tapered motion limiting surfaces 16 in the stud portion 12 of ball stud 10 and tapered motion limiting surfaces 26 at the outer end portions of the inner surfaces of both bearings 20. The respective diameters of motion limiting surfaces 16 and 26 being increasingly larger from the ball portion end to the collar-groove side end and from the inner end to the outer end. The motion limiting surfaces 16 and 26 are tapered such that dust covers 40 are prevented from directly receiving shock when ball stud 10 oscillates through its angular movement range.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A spherical slide bearing comprising:
    a bearing member;
    slide means, for slidably carrying a member, pivotably mounted in said bearing member;
    a housing having apertures on ends thereof;
    said bearing member being mounted in said housing;
    cover means for closing openings between said housing and said slide means;
    said cover means having an end mounted between said bearing member and said housing in a gap between said bearing member and said housing; and
    said bearing member having a first and a second step portion defining said gap for retaining said end between said bearing member and said housing such that said end does not interfere with angular movement of said slide means when compressed.

2. The spherical slide bearing of claim 1 wherein said means for retaining comprises:
    said end of said cover means including an outer sealing collar portion disposed in said gap;
    said bearing member being shaped and disposed within said housing so as to end said gap with a narrow gap that is narrower than said collar portion of said cover means and prevents passage of said collar portion out of said gap when under compression.

3. A spherical slide bearing comprising:
    a bearing member;
    slide means, for slidably carrying a member, pivotably mounted in said bearing member;
    a housing having apertures on ends thereof;
    said bearing member being mounted in said housing;
    cover means for closing openings between said housing and said slide means;
    said cover means having an end mounted between said bearing member and said housing in a gap formed between said bearing member and said housing;
    said end of said cover means including an outer sealing collar portion;
    flanges on said housing protruding radially inward and encircling said apertures;
    said bearing member having step portions encircling outer ends in an outer surface of said bearing member so as to create an inner ridge surface normal to a center axis of said bearing member;
    said bearing member defining a narrow gap between said inner ridge surface of said bearing member and said flange;
    said outer sealing collar portions being pressed in said gap between said step portion and said housing and flanges; and
    said narrow gap being narrower than a thickness of said outer sealing collar portion so that said outer sealing collar portion is retained between said bearing member and said housing, preventing interference by said outer sealing collar portion with angular movement of said slide means from occurring.

4. A spherical slide bearing for slidably and pivotably carrying a member according to claim 3 comprising:
    said slide means for slidably carrying the member having a stud portion;
    means for limiting angular motion of said slide means by engagement of said stud portion with said bearing member such that compression of said cover means between said housing and said slide means is prevented so as to preclude said cover means from being damaged.

5. The spherical slide bearing of claim 4 comprising:
    a tapered motion limiting surface formed upon the stud portion of said slide means;
    said tapered motion limiting surface having a first diameter next to a ball portion of said slide means at a first end of said stud portion and a second diameter, smaller than said first diameter, at a second end of said stud portion; and
    said tapered motion limiting surface being formed so as to engage an inside surface of said bearing member during angular movement of said slide means so that compression of said cover means by angular movement of said slide means is prevented and such that a range of angular movement of said slide means is increased over that of a configuration having an untapered limiting surface.

6. The spherical slide bearing of claim 4 comprising:
a tapered motion limiting surface form upon an inside surface of a through hole of said bearing member at an end thereof;
said tapered motion limiting surface having an inner diameter at an inner portion of said through hole, and an outer diameter, larger than said inner diameter, near said end of said through hole; and
said tapered motion limiting surface being formed so as to engage an outside surface of said stud portion of said slide means during angular movement of said slide means so that compression of said cover means by angular movement of said slide means is prevented and such that a range of angular movement of said slide means is increased over that of a configuration having an untapered limiting surface.

7. The spherical slide bearing of claim 6 comprising:
a second tapered motion limiting surface formed said stud portion;
said second tapered motion limiting surface having a first diameter next to a ball portion of said slide means at a first end of said stud portion and a second diameter, smaller than said first diameter, at a second end of said stud portion; and
said second tapered motion limiting surface being formed so as to engage said tapered motion limiting surface of said bearing member during angular movement of said slide means so that compression of said cover means by angular movement of said slide means is prevented and such that a range of angular movement of said slide means is increased over that of a configuration having one of one and two untapered limiting surfaces.

8. A spherical slide bearing comprising:
a ball stud having a ball portion and stud portions formed at the axial ends of said ball portion;
a housing having a pair of apertures each at ends thereof;
a bearing member;
said housing having the bearing member disposed therein;
said bearing member having the ball portion of the ball stud disposed therein;
said stud portions of the ball stud projecting from the pair of apertures of the housing;
dust covers for sealing spaces between the apertures of the housing and the stud portions of the ball stud;
inner and outer sealing collar portions encircling ends of said dust cover;
flange portions formed radially inward at each aperture of said housing, each creating a narrow gap between each bearing and flange;
said inner sealing collar portions of the dust covers being fitted around ends of the stud portions of the ball stud;
said outer sealing collar portions being pressed between said flange portions of the housing and the bearings in such a manner that the outer sealing collar portions are positioned radially outside the narrow gaps;
said bearing member including a pair of bearings each having inner and outer ends;
said bearings abutting each other at their inner ends and having notched steps formed in an outer portion of each of the outer ends of said bearings;
ridge surfaces of said notched steps;
said ridge surfaces being normal to an axis of the bearings and at the outer ends and next to inside radii thereof;
said flange portions encircling both apertures of said housing and protruding in an inward radial direction in such a manner that inner edges of said flange portions protrude at least to a position of said ridge surfaces of the bearings leaving said narrow gaps therebetween;
said dust covers having diaphragm portions between the inner sealing collar portion and the outer sealing collar portion;
said ball stud having annular means, encircling the ends of the stud portions, for holding said inner sealing collar portions of the dust covers;
said diaphragm portions passing through the respective narrow gaps between the corresponding stud portions of the ball stud and the flanges of the housing; and
said outer sealing collar portions are held radially outside said narrow gaps between the outer portions at the outer ends of the bearing and said flange of said housing.

9. A spherical slide bearing of claim 8 comprising:
motion limiting surfaces formed upon at least one of said stud portions; and
said motion limiting surface extending from an outer edge of the ball portion of the ball stud to the end of the stud portion, and having a diameter next to the ball portion greater than a diameter at the end of said stud portion.

10. A spherical slide bearing of claim 8 comprising:
a motion limiting surface formed at an outer end of an inner surface of said bearing member; and
said motion limiting surface having a diameter which increases in size from an inner end to an outer end thereof.

* * * * *